US012229099B1

(12) United States Patent
Bin et al.

(10) Patent No.: US 12,229,099 B1
(45) Date of Patent: Feb. 18, 2025

(54) SYSTEM, METHOD, AND COMPUTER PROGRAM FOR EXTRACTING ENTITY DATA FROM A PLURALITY OF RELATED DATA OBJECTS FROM AN EXTERNAL MULTI-TENANT SaaS ENVIRONMENT

(71) Applicant: Odaseva Technologies SAS, Neuilly-sur-Seine (FR)

(72) Inventors: Sovane Bin, San Francisco, CA (US); Saddek Dekoum, Ris Orangis (FR); Raphaël Fonrouge, Chatenay Malabry (FR); Francois Lopitaux, San Carlos, CA (US); Sohil Sheth, Walpole, MA (US); Nicolas Roquebert, Villepreux (FR); Omar Albasaiteh, Colombes (FR)

(73) Assignee: Odaseva Technologies SAS, Neuilly-sur-Seine (FR)

( * ) Notice: Subject to any disclaimer, the term of this patent is extended or adjusted under 35 U.S.C. 154(b) by 0 days.

(21) Appl. No.: 17/960,736

(22) Filed: Oct. 5, 2022

(51) Int. Cl.
*G06F 16/00* (2019.01)
*G06F 16/22* (2019.01)

(52) U.S. Cl.
CPC ...... *G06F 16/2246* (2019.01); *G06F 16/2272* (2019.01)

(58) Field of Classification Search
None
See application file for complete search history.

(56) References Cited

U.S. PATENT DOCUMENTS

| | | | | |
|---|---|---|---|---|
| 6,642,946 | B1 * | 11/2003 | Janes | G06Q 10/087 715/962 |
| 8,078,645 | B2 * | 12/2011 | Singh | G06F 16/2246 707/802 |
| 8,255,320 | B1 * | 8/2012 | Seal | G06Q 40/03 705/38 |
| 9,268,587 | B2 | 2/2016 | Kruglick | |
| 9,330,301 | B1 | 5/2016 | Ozog | |
| 9,769,131 | B1 | 9/2017 | Hartley et al. | |
| 10,664,494 | B2 | 5/2020 | Ding et al. | |
| 11,055,123 | B1 | 7/2021 | Bin et al. | |
| 11,609,774 | B2 | 3/2023 | Bin et al. | |
| 12,032,718 | B1 | 7/2024 | Bin et al. | |

(Continued)

FOREIGN PATENT DOCUMENTS

WO 2022081408 4/2022

*Primary Examiner* — Polina G Peach
(74) *Attorney, Agent, or Firm* — Lessani Law Group, PC

(57) ABSTRACT

The present invention extracts entity data from a plurality of related data objects from an external multi-tenant SaaS environment. The system extracts metadata related to an entity's data records and uses the metadata to identify a data schema associated with the entity's data. The system provides an interface for enabling a user to create an extraction tree that includes the data objects in the data schema from which data will be extracted. Enabling a user to create an extraction tree includes enabling a user to add a root node to the extraction tree, add any parent and child nodes of the root node in the data schema to a next level of the extraction tree, and add multiple additional levels of the extraction tree. The system creates an extraction plan based on the extraction tree and extracts data from the multi-tenant SaaS environment based on the extraction plan.

18 Claims, 6 Drawing Sheets

(56) References Cited

U.S. PATENT DOCUMENTS

| | | | |
|---|---|---|---|
| 12,056,723 B1 | 8/2024 | Bin et al. | |
| 2006/0150169 A1* | 7/2006 | Cook | G06F 8/34 |
| | | | 717/156 |
| 2008/0049942 A1 | 2/2008 | Sprunk et al. | |
| 2008/0162532 A1* | 7/2008 | Daga | G06F 16/248 |
| | | | 707/999.102 |
| 2008/0270444 A1* | 10/2008 | Brodie | G06F 3/0482 |
| | | | 707/999.102 |
| 2009/0031230 A1* | 1/2009 | Kesler | G06F 16/252 |
| | | | 715/764 |
| 2010/0079460 A1* | 4/2010 | Breeds | G06F 16/26 |
| | | | 345/440 |
| 2012/0059857 A1* | 3/2012 | Jackson, Jr. | G06F 16/282 |
| | | | 707/E17.012 |
| 2012/0110566 A1* | 5/2012 | Park | G06F 9/4451 |
| | | | 717/174 |
| 2012/0117558 A1 | 5/2012 | Futty et al. | |
| 2012/0254197 A1* | 10/2012 | Kuzmin | G06F 3/04886 |
| | | | 707/751 |
| 2012/0324242 A1 | 12/2012 | Kirsch | |
| 2013/0191780 A1* | 7/2013 | Holmes | G06F 16/81 |
| | | | 715/808 |
| 2013/0227703 A1 | 8/2013 | Sotos et al. | |
| 2013/0246451 A1* | 9/2013 | Kaiser | G06F 16/28 |
| | | | 707/769 |
| 2013/0283060 A1 | 10/2013 | Kulkarni et al. | |
| 2013/0297769 A1 | 11/2013 | Chang et al. | |
| 2014/0040182 A1* | 2/2014 | Gilder | G06F 16/256 |
| | | | 707/602 |
| 2014/0040196 A1 | 2/2014 | Wijayaratne et al. | |
| 2014/0040197 A1 | 2/2014 | Wijayaratne et al. | |
| 2014/0101438 A1 | 4/2014 | Elovici et al. | |
| 2014/0143661 A1* | 5/2014 | Carreno-Fuentes | |
| | | | G06F 3/0486 |
| | | | 715/255 |
| 2014/0278534 A1 | 9/2014 | Romeo | |
| 2014/0344778 A1* | 11/2014 | Lau | G06F 8/35 |
| | | | 717/106 |
| 2016/0019233 A1 | 1/2016 | Wijayaratne et al. | |
| 2016/0147999 A1 | 5/2016 | Fontanetta et al. | |
| 2016/0308855 A1 | 10/2016 | Lacey et al. | |
| 2017/0025040 A1 | 1/2017 | Maturana et al. | |
| 2017/0048252 A1 | 2/2017 | Straub et al. | |
| 2017/0091293 A1* | 3/2017 | Cummings | G06F 16/3344 |
| 2017/0249656 A1 | 8/2017 | Gantner et al. | |
| 2018/0081905 A1* | 3/2018 | Kamath | G06F 16/287 |
| 2018/0089270 A1* | 3/2018 | Qiu | G06F 16/24542 |
| 2018/0150476 A1 | 5/2018 | Koos et al. | |
| 2018/0176117 A1 | 6/2018 | Gudetee et al. | |
| 2018/0181613 A1* | 6/2018 | Acharya | G06F 16/243 |
| 2018/0232402 A1* | 8/2018 | Bhatti | G06F 16/9024 |
| 2019/0007206 A1 | 1/2019 | Surla et al. | |
| 2019/0034509 A1 | 1/2019 | Ding et al. | |
| 2019/0042988 A1 | 2/2019 | Brown et al. | |
| 2019/0050925 A1* | 2/2019 | Hodge | G06F 3/0482 |
| 2019/0303270 A1* | 10/2019 | Hoermann | G06F 11/3664 |
| 2020/0026532 A1* | 1/2020 | Bill | G06Q 10/087 |
| 2020/0067772 A1 | 2/2020 | Tomkins et al. | |
| 2020/0073854 A1 | 3/2020 | Wijayaratne et al. | |
| 2020/0082890 A1 | 3/2020 | Karr et al. | |
| 2020/0127937 A1 | 4/2020 | Busick et al. | |
| 2020/0159700 A1 | 5/2020 | Wijayaratne et al. | |
| 2020/0183906 A1* | 6/2020 | Spillane | G06F 16/86 |
| 2021/0049029 A1 | 2/2021 | Kumble et al. | |
| 2021/0067324 A1 | 3/2021 | Valente et al. | |
| 2021/0255991 A1 | 8/2021 | Koos et al. | |
| 2021/0255992 A1 | 8/2021 | Wijayaratne et al. | |
| 2021/0349580 A1* | 11/2021 | Dentzer | G06F 3/0485 |
| 2022/0067115 A1 | 3/2022 | Zheng et al. | |
| 2022/0107826 A1 | 4/2022 | Bin et al. | |
| 2022/0129804 A1 | 4/2022 | Dooley et al. | |
| 2022/0148084 A1* | 5/2022 | Baker | G06N 20/00 |
| 2022/0188334 A1* | 6/2022 | Chen | G06F 16/2455 |
| 2022/0207489 A1 | 6/2022 | Gupta et al. | |
| 2022/0317831 A1* | 10/2022 | Karis | G06F 3/04817 |
| 2023/0010219 A1* | 1/2023 | Howley | H04L 41/20 |
| 2023/0082010 A1* | 3/2023 | Clifford | G06F 16/2282 |
| | | | 707/736 |
| 2023/0145349 A1* | 5/2023 | Watari | G06F 16/9027 |
| | | | 707/713 |
| 2023/0237034 A1* | 7/2023 | Garg | G06F 16/2246 |
| | | | 707/797 |
| 2023/0315694 A1 | 10/2023 | Koos et al. | |
| 2023/0325360 A1 | 10/2023 | Wijayaratne et al. | |

\* cited by examiner

SYSTEM, METHOD, AND COMPUTER PROGRAM FOR EXTRACTING ENTITY DATA FROM A PLURALITY OF RELATED DATA OBJECTS FROM AN EXTERNAL MULTI-TENANT SaaS ENVIRONMENT

BACKGROUND OF THE INVENTION

1. Field of the Invention

This invention relates generally to a multi-tenant SaaS environment and, more specifically, to a system and method for extracting entity data from a plurality of related data objects from an external multi-tenant SaaS environment.

2. Description of the Background Art

Companies need to be able to handle a multitude of complex, interrelated data. In one exemplary scenario, a customer service contact center that uses software, such as SALESFORCE, needs to manage customer cases. Every time a customer calls in, the system would create a ticket to track the issue and include information such as conversations, emails, chats, text, SMS, etc. Since the customer service contact center has so many customers, which leads to numerous customer calls and created tickets, the customer service contact center may soon face the dilemma of their SALESFORCE system slowing down or paying expensive storage fees. They may instead choose to archive the data (i.e., extract, but not delete the data) for easy accessibility while not storing it directly in the system. SALESFORCE is a huge database with multiple tables such that every table is linked to each other (e.g., case table, case comment table, email table, SMS table, etc.). Therefore, there is a need for a system and method that would enable a user to more easily select a plurality of interrelated tables and specify which data within the interrelated tables to extract.

SUMMARY OF THE DISCLOSURE

The present disclosure describes a system, method, and computer program for extracting entity data from a plurality of related data objects from an external multi-tenant SaaS environment. The method is performed by a computer system that includes servers, storage systems, networks, operating systems, and databases.

The present invention provides a graphical user interface, and, in an alternate embodiment, an API, to create an extraction tree for extracting data objects stored in an external multi-tenant SaaS environment. The present invention also provides a novel data schema for organizing the data objects in the graphical user interface such that a user is able to traverse up and down the hierarchy of the data schema from any node (not just the root node) in adding descending nodes to the extraction tree. The present invention also enables the user to set extraction filter criteria for each data object added to the extraction tree. The benefit is that when the user sets extraction filter criteria for a data object, the child nodes of the data object are consistently filtered based on the extraction filter criteria, resulting in a targeted data extraction using the data schema. The present invention also provides a "quick start" algorithm that enables the user to select a plurality of data objects for the "quick start" algorithm to try to connect together and automatically create an extraction tree (rather than graphically adding a root node and graphically adding and connecting a plurality of parent and child nodes within the extraction tree).

In one embodiment, a method for extracting entity data from a plurality of related data objects from an external multi-tenant SaaS environment comprises the following steps:

extracting metadata related to an entity's data records in the external multi-tenant SaaS environment;

using the metadata to identify a data schema associated with the entity's data in the multi-tenant SaaS environment;

providing an interface for enabling a user to create an extraction tree that includes the data objects in the data schema from which data will be extracted, wherein the extraction tree has a plurality of levels, wherein each level has at least one node corresponding to a data object in the data schema, wherein, in adding a child node to a parent node in the extraction tree, the user is able to select from both parent and child data objects of the parent node in the data schema, and wherein enabling a user to create an extraction tree comprises:

enabling a user to add a root node to the extraction tree;

enabling a user to add any parent and child nodes of the root node in the data schema to a next level of the extraction tree;

enabling a user to add multiple additional levels of the extraction tree, wherein at each new level the user is able to add both parent and child data objects in the data schema to nodes in the previous level, enabling a user to traverse up and down the hierarchy of the data schema in adding descending nodes to the extraction tree;

creating an extraction plan based on the extraction tree; and extracting data from the multi-tenant SaaS environment based on the extraction plan.

DETAILED DESCRIPTION OF THE PREFERRED EMBODIMENTS

The present disclosure describes a system, method, and computer program for extracting entity data from a plurality of related data objects from an external multi-tenant SaaS environment. The method is performed by a computer system that includes servers, storage systems, networks, operating systems, and databases ("the system").

Example implementations of the method are described in more detail with respect to FIGS. 1-4.

1. METHOD FOR EXTRACTING ENTITY DATA FROM A PLURALITY OF RELATED DATA OBJECTS FROM AN EXTERNAL MULTI-TENANT SAAS ENVIRONMENT

Figure 1:
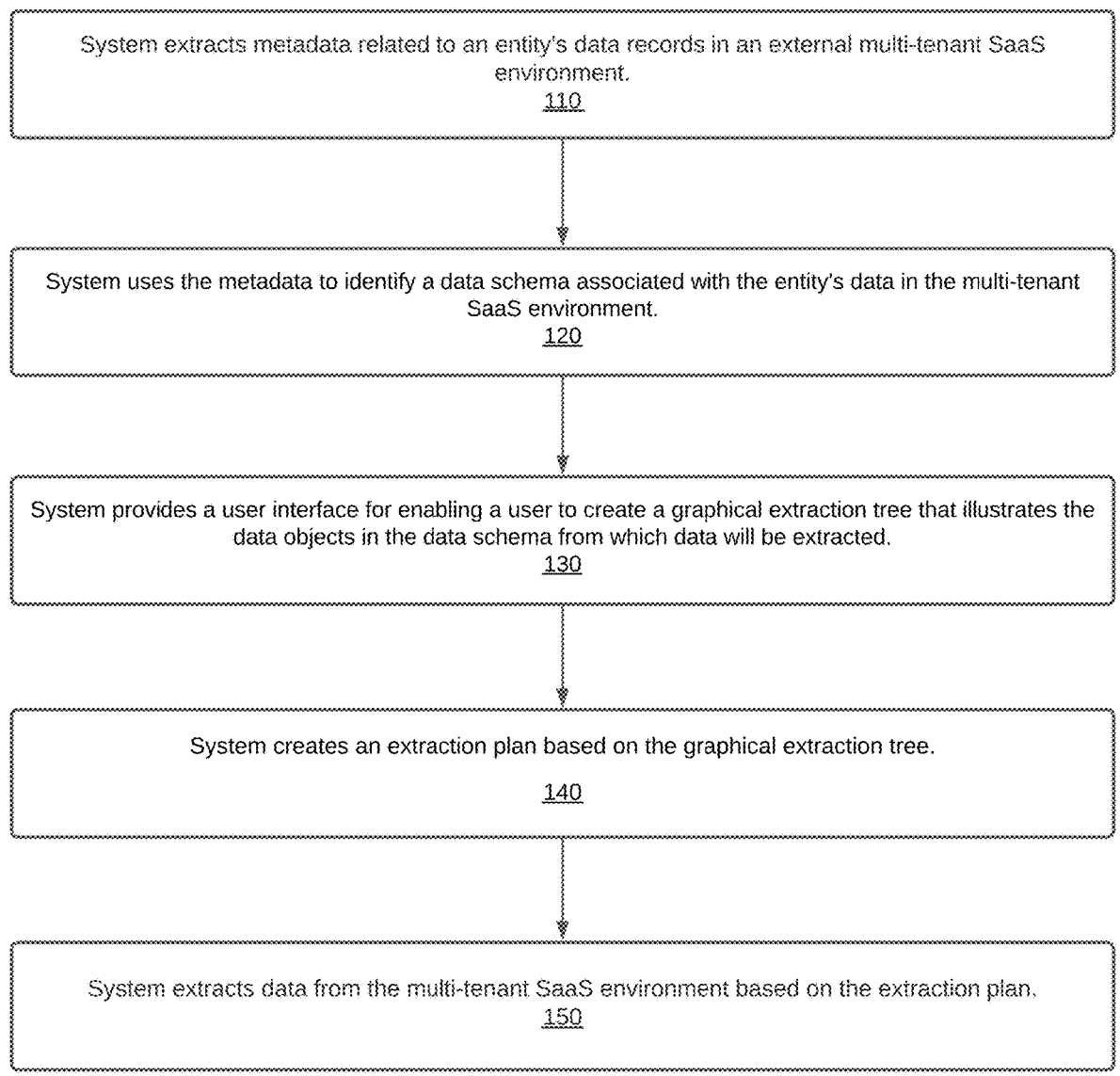
FIG. 1 is a flowchart that illustrates a method, according to one embodiment, for extracting entity data from a plurality of related data objects from an external multi-tenant SaaS environment.

FIG. 1 illustrates a method for extracting entity data from a plurality of related data objects from an external multi-tenant SaaS environment. The system extracts metadata related to an entity's data records in an external multi-tenant SaaS environment (step 110). The system uses the metadata to identify a data schema associated with the entity's data in the multi-tenant SaaS environment (step 120). The system provides a user interface for enabling a user to create a graphical extraction tree that illustrates the data objects in the data schema from which the data will be extracted (step 130). The extraction tree has a plurality of levels. Each level has at least one node corresponding to a data object in the data schema. In adding a child node to a parent node in the graphical extraction tree, the user is able to select from both parent and child data objects of the parent node in the data schema. In certain embodiments, the system enables the user to set extraction filter criteria for each data object inserted into the extraction tree by the user. The system creates an extraction plan based on the graphical extraction tree (step 140). The system extracts data from the multi-tenant SaaS environment based on the extraction plan (step 150).

In certain embodiments, instead of the system providing a graphical user interface for enabling a user to create a graphical extraction tree, the system provides an API that enables the user to use a different user interface (e.g., created by a third-party) to interface with the system to create an extraction tree. Similar to the system-provided graphical user interface, the different user interface would enable the user to view the extraction tree and select nodes for the extraction tree.

In certain embodiments, the system also performs a "quick start" algorithm in which, in response to a user selecting a plurality of starting nodes to create the extraction tree, the system automatically adds any connecting nodes between the plurality of starting nodes in creating the extraction tree. In certain embodiments, the system also automatically adds one or more child nodes of each of the selected starting nodes in the data schema to a next level of the extraction tree.

In certain embodiments, the method further includes identifying chunks of data in a data object for purposes of data extraction, and, after extracting the data object by extracting the chunks of data, reconciling the chunks of data in the data object. For further details regarding such extraction techniques, please see U.S. patent application Ser. No. 17/496,543, entitled "System Method, and Computer Program for Extracting Large Customer Data Volumes at High Speed from an External Multi-tenant SaaS Environment," filed on Oct. 7, 2021, which is incorporated by reference as if fully disclosed herein.

In certain embodiments, the system and method described herein are used for the purpose of archiving, sandboxing seeding, consumer rights, etc.

2. METHOD FOR ENABLING A USER TO CREATE AN EXTRACTION TREE

Figure 2:
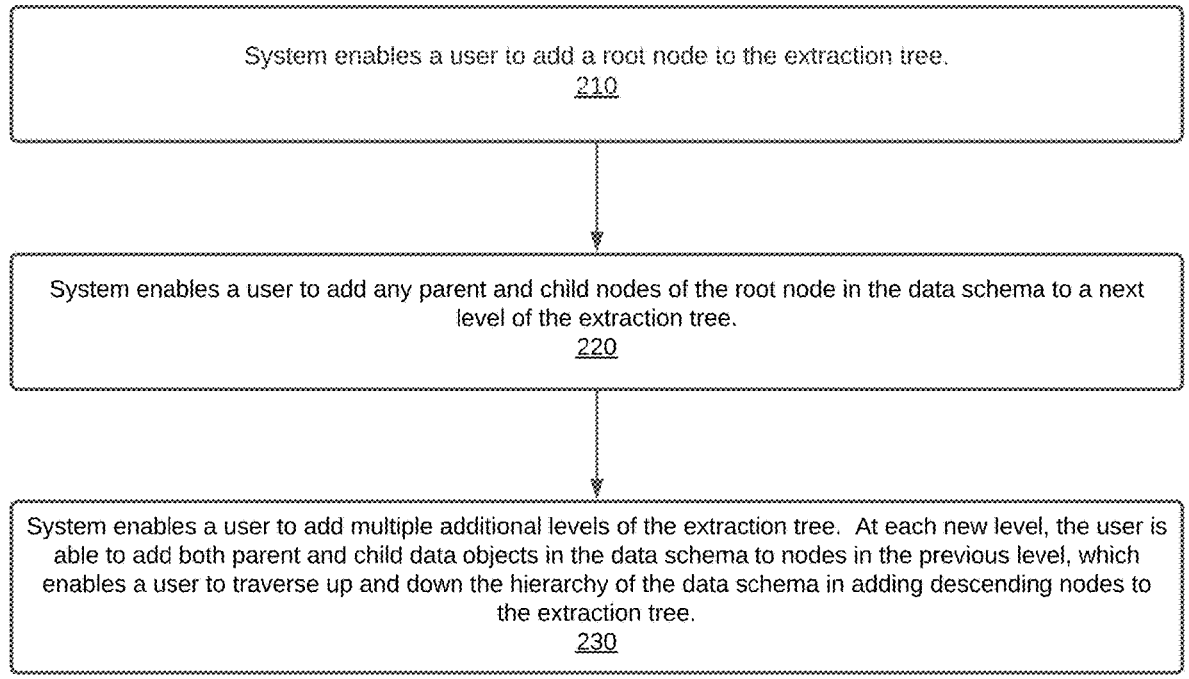
FIG. 2 is a flowchart that illustrates a method, according to one embodiment, for enabling a user to create an extraction tree.

FIG. 2 illustrates a method for enabling a user to create an extraction tree. The system enables a user to add a root node to the extraction tree (step 210). The system enables a user to add any parent and child nodes of the root node in the data schema to a next level of the extraction tree (step 220). The system enables a user to add multiple additional levels of the extraction tree (step 230). At each new level, the user is able to add both parent and child data objects in the data schema to nodes in the previous level, which enables a user to traverse up and down the hierarchy of the data schema from any node (and not just the root node) in adding descending nodes to the extraction tree.

3. EXAMPLE SCREENSHOTS OF USER INTERFACE FOR ENABLING A USER TO CREATE A GRAPHICAL EXTRACTION TREE

FIGS. 3A-3F illustrate screenshots of an exemplary user interface for enabling a user to create a graphical extraction tree according to the present invention. A person skilled in the art would understand that the present invention may be embodied in other user interfaces having more or less functionality within the scope of the present invention. As such, FIGS. 3A-3F are intended to be illustrative and not limiting in any way.

Figure 3A:
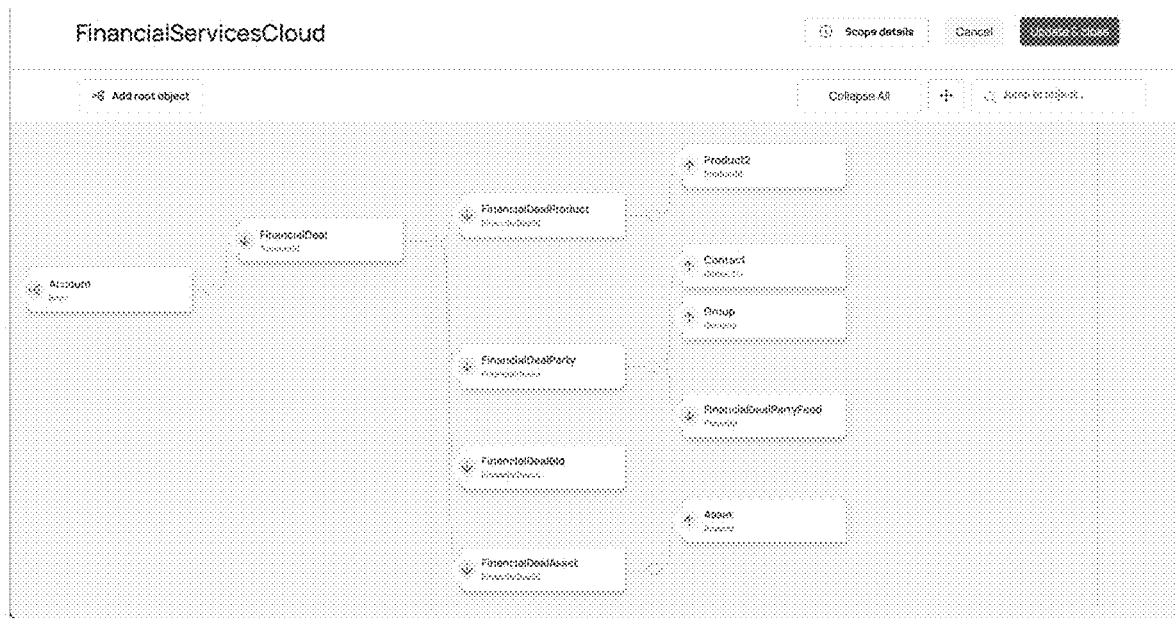
FIGS. 3A-3F are screenshots of an exemplary user interface, according to one embodiment, for enabling a user to create a graphical extraction tree.

As seen in FIG. 3A, a graphical user interface is provided for the "Financial Services Cloud" that includes a root node (e.g., "Account") that was created by the user clicking the "Add root object" button, a plurality of child nodes (nodes with the arrow pointing downward), and a plurality of parent nodes (nodes with the arrow pointing upward). As previously discussed, the data schema for the graphical user interface is unique because instead of being a top down hierarchy, it enables a user to traverse up and down the hierarchy of the data schema from any given node in the graphical extraction tree.

Figure 3B:
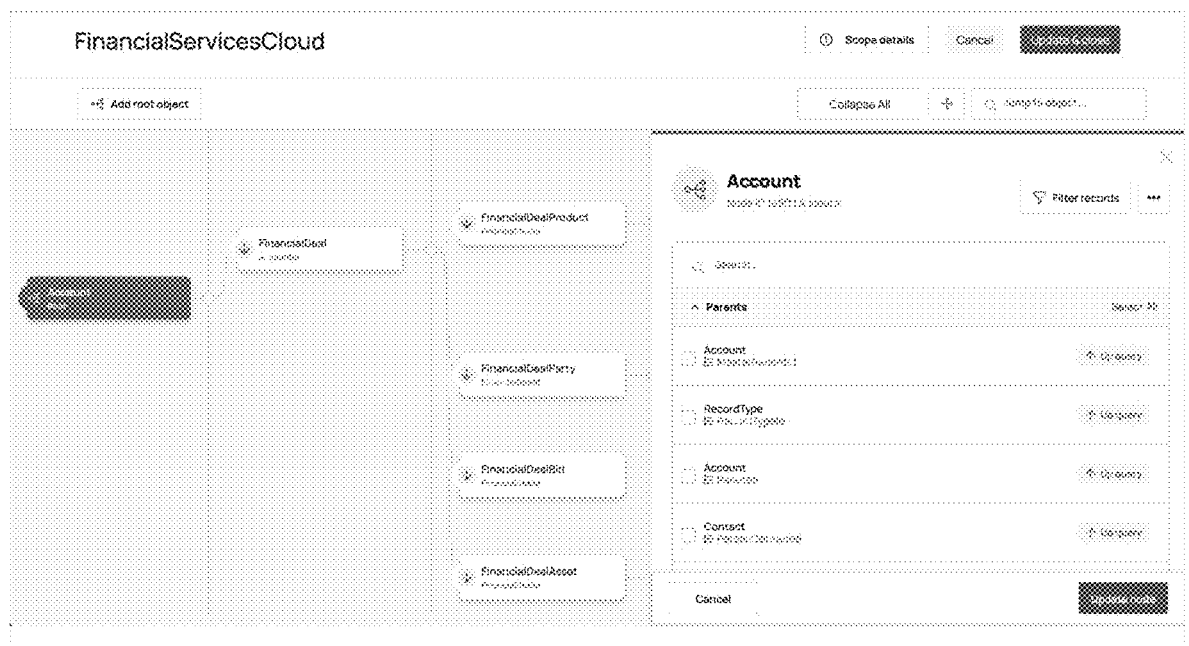

As seen in FIG. 3B, when the user selects a node, in this case, the root node (i.e., "Account"), the system provides a window overlay that enables the user to add any parent or child nodes of the root node in the data schema to a next level of the extraction tree. While the window overlay as illustrated shows a plurality of available parent nodes, if the user scrolls down, the window overlay would also show a plurality of available child nodes. The user then has the option to select one or more of the parent and/or child nodes for adding to the root node. This process can be done with any node in the graphical extraction tree.

Figure 3C:
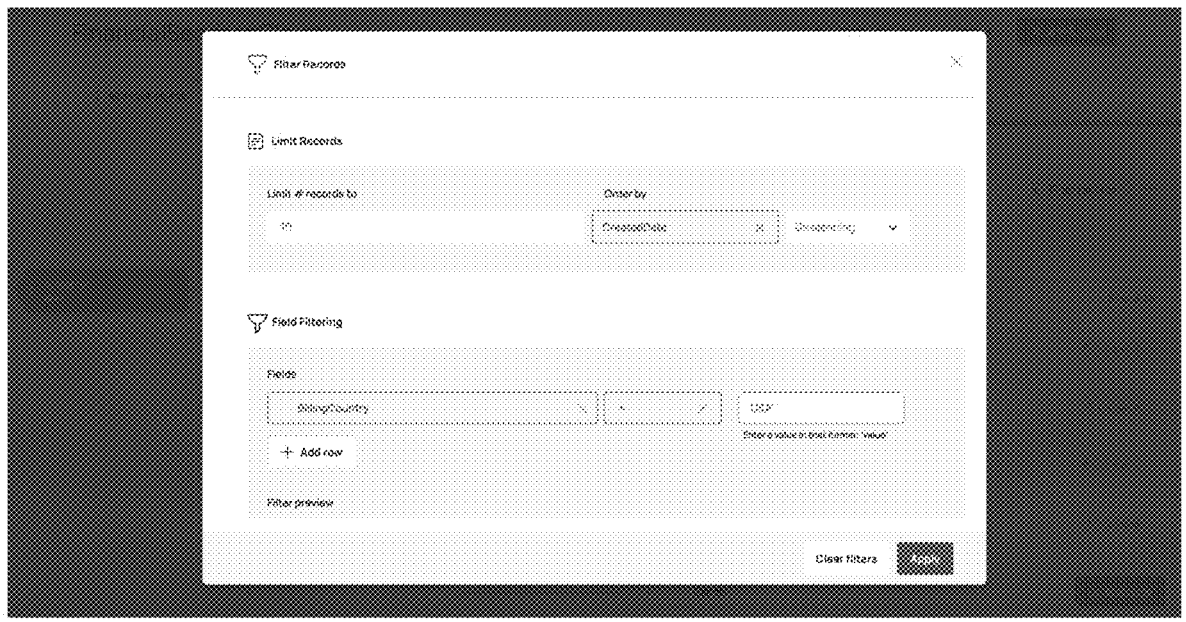

As seen in FIG. 3C, as the user is creating the graphical extraction tree, the system enables the user to set extraction filter criteria for each data object inserted into the graphical extraction tree by the user. In certain embodiments, the extraction filter criteria may include one or more of: limiting the rows in a data object from which data will be extracted, limiting the fields in the data object from which data will be extracted, and matching the fields/values in the data object. In certain embodiments, the extraction filter criteria include skipping specified rows or fields. In certain embodiments, when the user sets extraction filter criteria for a data object, the child nodes of the data object are consistently filtered based on the extraction filter criteria, resulting in a targeted data extraction using the data schema. For example, if the user selects only five specific accounts in the node "Accounts" for extraction, the child nodes would also reflect the data objects related to the five specific accounts.

Figure 3D:
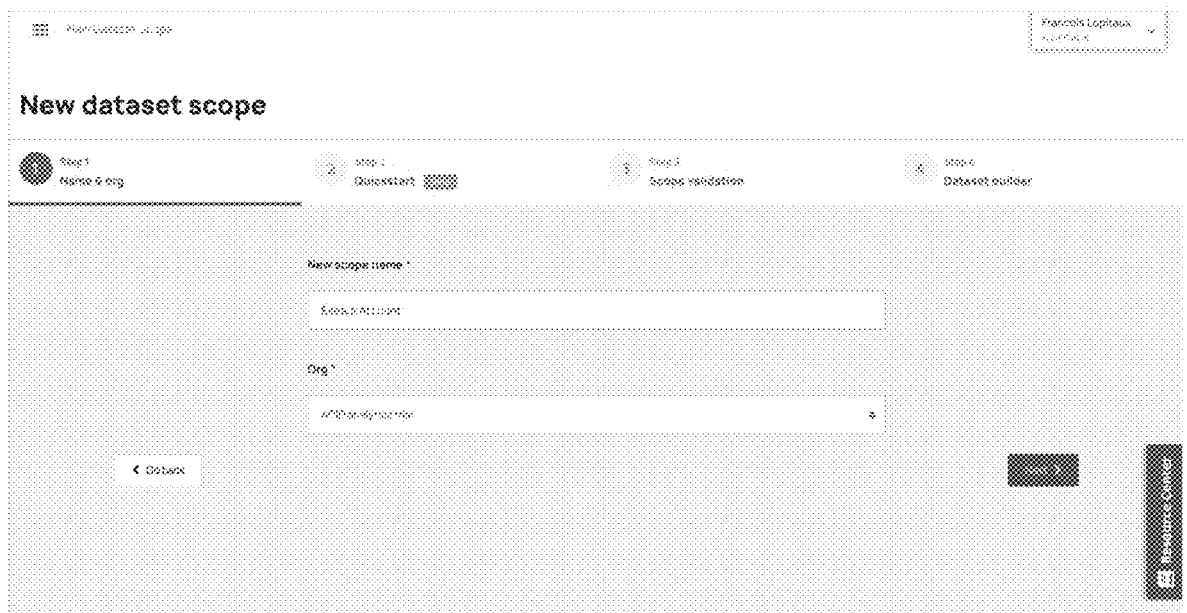
Figure 3E:
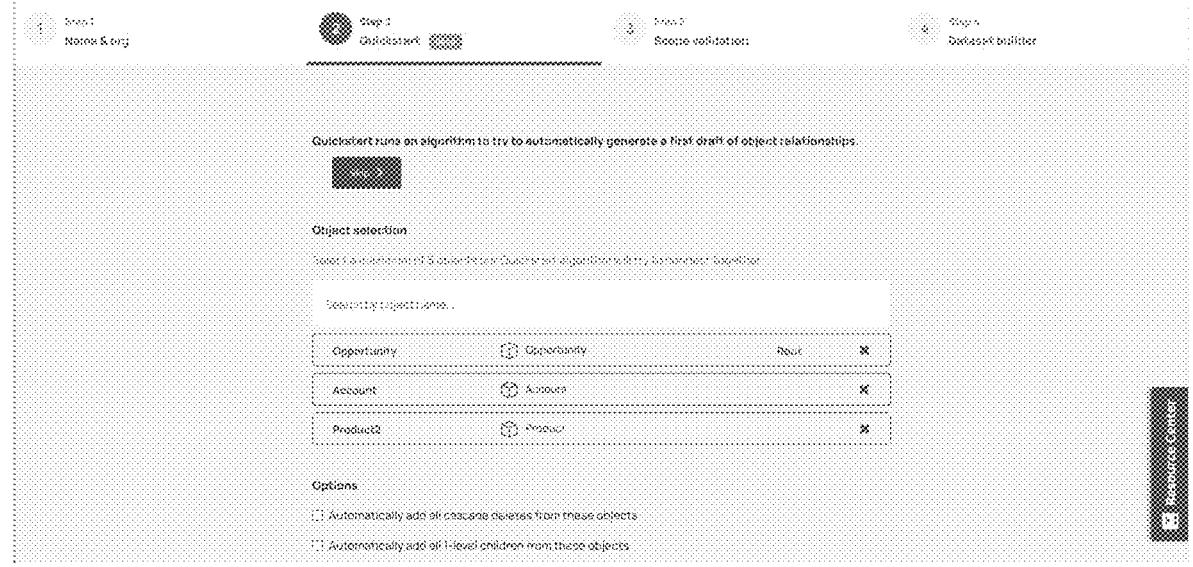
Figure 3F:
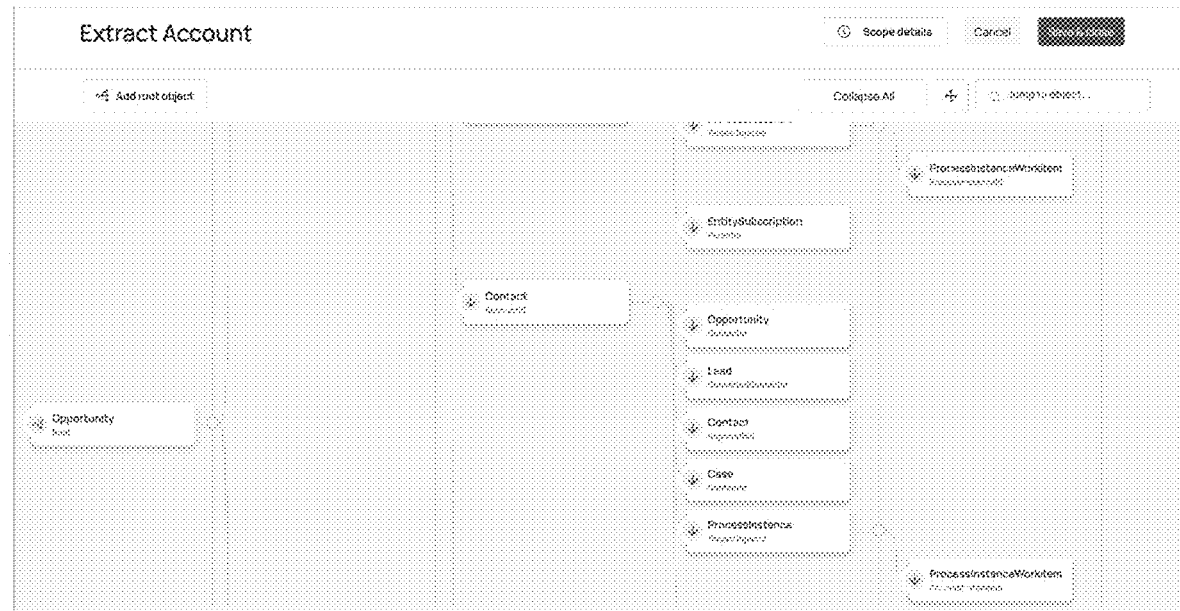

As seen in FIGS. 3D-3F, instead of creating the graphical extraction tree by the user graphically adding a root node and graphically adding and connecting a plurality of parent and child nodes, a graphical extraction tree can also be created through a "quick start" algorithm. As seen in FIG.

3D, the user defines a new scope name and organization in step 1. In this case, the new scope name is "Extract Account" and the organization is "ACID analytics trial."

As seen in FIG. 3E, the user is able to select a plurality of data objects for the "quick start" algorithm to try to connect together in step 2. In certain embodiments, the "quick start" algorithm has a maximum number of starting data objects (e.g., five data objects) that the user may select. In certain embodiments, the user can select to automatically add all cascade deletes from the selected data objects and/or to automatically add all first-level children from the selected data objects. The system then runs a scope validation algorithm in step 3 and builds the dataset in step 4.

As seen in FIG. 3F, the "quick start" algorithm has created a graphical extraction tree labeled "Extract Account" with the starting data objects selected by the user in step 2 (see FIG. 3E). The "quick start" algorithm automatically inserts any nodes that are in between the selected starting data objects in order to connect the selected starting data objects. In certain embodiments, the "quick start" algorithm also automatically adds one or more child nodes to each of the selected starting data objects (e.g., one level of child nodes) in order to provide more information regarding each of the selected starting data objects. The user can then adjust the graphical extraction tree by adding and/or deleting nodes, and/or the user can adjust the extraction filter criteria for each data object inserted into the graphical extraction tree by the user.

4. EXAMPLE SYSTEM ARCHITECTURE

Figure 4:
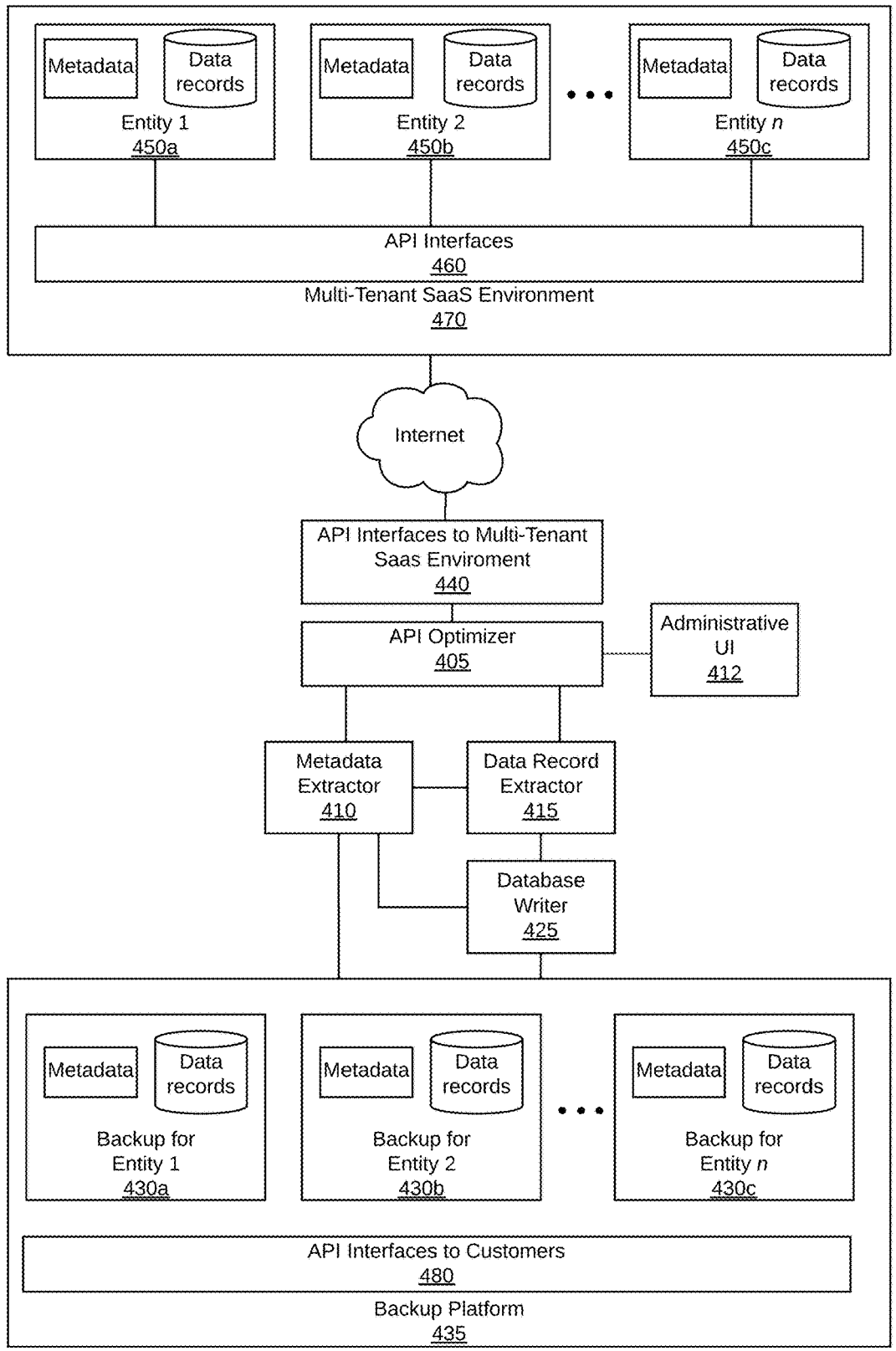
FIG. 4 is a block diagram that illustrates an example system architecture according to one embodiment.

FIG. 4 illustrates an example architecture for a system that performs the methods described herein. However, the methods described herein may be implemented in other systems and are not limited to the illustrated system. In order to obtain metadata and extract data records from a plurality of entities (e.g., Entity 1 to Entity n) in a multi-tenant SaaS environment 470 via the internet, one or more API interfaces 440 interfaces with the API interfaces 460 of the multi-tenant SaaS environment 470, an API optimizer 405 distributes API requests among a plurality of APIs and has a corresponding administrative user interface (UI) 412, a metadata extractor 410 extracts metadata, a data record extractor 415 extracts data records, and a database writer 425 writes to the database of the backup platform 435.

The backup platform 435 hosts a backup for each entity 430*a*, 430*b*, 430*c*. Each backup 430*a*, 430*b*, 430*c* includes the metadata and extracted data records that corresponds to the metadata and data records for each entity in the multi-tenant SaaS environment 450*a*, 450*b*, 450*c*. Both the multi-tenant SaaS environment 470 and the backup platform 435 do not provide a separate database for each entity. Hence, while the data records are illustrated separately using database symbols with respect to each entity in both the multi-tenant SaaS environment 470 and the backup platform 435, the database(s) is (are) often shared between entities on their respective servers. A customer can make API calls to the backup 430*a*, 430*b*, 430*c* via API interface 480.

5. GENERAL

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for extracting entity data from a plurality of related data objects from an external multi-tenant software-as-a-service (SaaS) environment, the method comprising:
    extracting metadata related to an entity's data records in the external multi-tenant SaaS environment;
    using the metadata to identify a data schema associated with the entity's data in the multi-tenant SaaS environment, wherein the data schema forms a hierarchy of at least three levels of the entity's data in the multi-tenant SaaS environment;
    providing an interface for enabling a user to create an extraction tree;
    creating the extraction tree in the interface by a user viewing data objects in the data schema and selecting a plurality of data objects in the data schema as nodes in the extraction tree, wherein the extraction tree is stored in memory;
    building the extraction tree by the system automatically inserting any connecting data objects that are in between the selected plurality of data objects in the data schema as connecting nodes in the extraction tree;
    enabling a user to add any parent and child data objects in the data schema of the selected plurality of data objects and the any connecting data objects that were added as nodes and connecting nodes to the extraction tree to a next level of the extraction tree;
    enabling a user to add multiple additional levels to the extraction tree, wherein at each new level of the extraction tree the user is able to add both parent and child data objects in the data schema of data objects corresponding to nodes in a previous level of the extraction tree, enabling a user to traverse up and down the hierarchy of the data schema in adding child nodes to the extraction tree;
    creating an extraction plan based on the extraction tree; and
    extracting data from the multi-tenant SaaS environment based on the extraction plan.

2. The method of claim 1, wherein, as the user is creating the extraction tree, the system enables the user to set extraction filter criteria for each data object inserted into the extraction tree by the user.

3. The method of claim 2, wherein the extraction filter criteria comprises one or more of: limiting the rows in a data object from which data will be extracted, limiting the fields in the data object from which data will be extracted, and matching the fields and values in the data object.

4. The method of claim 2, wherein the extraction filter criteria comprises skipping specified rows or fields.

5. The method of claim 1, wherein the interface is a graphical user interface.

6. The method of claim 1, wherein the interface is an application programming interface (API).

7. A non-transitory computer-readable medium comprising a computer program, that, when executed by a computer system, enables the computer system to perform the following steps for extracting entity data from a plurality of related data objects from an external multi-tenant software-as-a-service (SaaS) environment, the steps comprising:
- extracting metadata related to an entity's data records in the external multi-tenant SaaS environment;
- using the metadata to identify a data schema associated with the entity's data in the multi-tenant SaaS environment, wherein the data schema forms a hierarchy of at least three levels of the entity's data in the multi-tenant SaaS environment;
- providing an interface for enabling a user to create an extraction tree;
- creating the extraction tree in the interface by a user viewing data objects in the data schema and selecting a plurality of data objects in the data schema as nodes in the extraction tree, wherein the extraction tree is stored in memory;
- building the extraction tree by the system automatically inserting any connecting data objects that are in between the selected plurality of data objects in the data schema as connecting nodes in the extraction tree;
- enabling a user to add any parent and child data objects in the data schema of the selected plurality of data objects and the any connecting data objects that were added as nodes and connecting nodes to the extraction tree to a next level of the extraction tree;
- enabling a user to add multiple additional levels to the extraction tree, wherein at each new level of the extraction tree the user is able to add both parent and child data objects in the data schema of data objects corresponding to nodes in a previous level of the extraction tree, enabling a user to traverse up and down the hierarchy of the data schema in adding child nodes to the extraction tree;
- creating an extraction plan based on the extraction tree; and
- extracting data from the multi-tenant SaaS environment based on the extraction plan.

8. The non-transitory computer-readable medium of claim 7, wherein, as the user is creating the extraction tree, the system enables the user to set extraction filter criteria for each data object inserted into the extraction tree by the user.

9. The non-transitory computer-readable medium of claim 8, wherein the extraction filter criteria comprises one or more of: limiting the rows in a data object from which data will be extracted, limiting the fields in the data object from which data will be extracted, and matching the fields and values in the data object.

10. The non-transitory computer-readable medium of claim 8, wherein the extraction filter criteria comprises skipping specified rows or fields.

11. The non-transitory computer-readable medium of claim 7, wherein the interface is a graphical user interface.

12. The non-transitory computer-readable medium of claim 7, wherein the interface is an application programming interface (API).

13. A computer system for extracting entity data from a plurality of related data objects from an external multi-tenant software-as-a-service (SaaS) environment, the system comprising:
- one or more processors;
- one or more memory units coupled to the one or more processors, wherein the one or more memory units store instructions that, when executed by the one or more processors, cause the system to perform the operations of:
  - extracting metadata related to an entity's data records in the external multi-tenant SaaS environment;
  - using the metadata to identify a data schema associated with the entity's data in the multi-tenant SaaS environment, wherein the data schema forms a hierarchy of at least three levels of the entity's data in the multi-tenant SaaS environment;
  - providing an interface for enabling a user to create an extraction tree;
  - creating the extraction tree in the interface by a user viewing data objects in the data schema and selecting a plurality of data objects in the data schema as nodes in the extraction tree, wherein the extraction tree is stored in memory;
  - building the extraction tree by the system automatically inserting any connecting data objects that are in between the selected plurality of data objects in the data schema as connecting nodes in the extraction tree;
  - enabling a user to add any parent and child data objects in the data schema of the selected plurality of data objects and the any connecting data objects that were added as nodes and connecting nodes to the extraction tree to a next level of the extraction tree;
  - enabling a user to add multiple additional levels to the extraction tree, wherein at each new level of the extraction tree the user is able to add both parent and child data objects in the data schema of data objects corresponding to nodes in a previous level of the extraction tree, enabling a user to traverse up and down the hierarchy of the data schema in adding child nodes to the extraction tree;
  - creating an extraction plan based on the extraction tree; and
  - extracting data from the multi-tenant SaaS environment based on the extraction plan.

14. The computer system of claim 13, wherein, as the user is creating the extraction tree, the system enables the user to set extraction filter criteria for each data object inserted into the extraction tree by the user.

15. The computer system of claim 14, wherein the extraction filter criteria comprises one or more of: limiting the rows in a data object from which data will be extracted, limiting the fields in the data object from which data will be extracted, and matching the fields and values in the data object.

16. The computer system of claim 14, wherein the extraction filter criteria comprises skipping specified rows or fields.

17. The computer system of claim 13, wherein the interface is a graphical user interface.

18. The computer system of claim 13, wherein the interface is an application programming interface (API).

* * * * *